United States Patent
da Silva et al.

(10) Patent No.: US 10,142,916 B2
(45) Date of Patent: Nov. 27, 2018

(54) METHODS, NETWORK NODE AND WIRELESS DEVICE FOR HANDLING SYSTEM INFORMATION

(71) Applicant: Telefonaktiebolaget LM Ericsson (publ), Stockholm (SE)

(72) Inventors: Icaro L. J. da Silva, Bromma (SE); Gunnar Mildh, Sollentuna (SE); Jose Luis Pradas, Stockholm (SE); Johan Rune, Lidingö (SE)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 15/521,716

(22) PCT Filed: Nov. 3, 2015

(86) PCT No.: PCT/EP2015/075597
§ 371 (c)(1),
(2) Date: Apr. 25, 2017

(87) PCT Pub. No.: WO2017/076432
PCT Pub. Date: May 11, 2017

(65) Prior Publication Data
US 2018/0020394 A1   Jan. 18, 2018

(51) Int. Cl.
*H04W 48/08* (2009.01)
*H04W 48/12* (2009.01)
(Continued)

(52) U.S. Cl.
CPC ............. *H04W 48/08* (2013.01); *H04W 8/02* (2013.01); *H04W 48/12* (2013.01);
(Continued)

(58) Field of Classification Search
CPC ....... H04W 48/08; H04W 8/02; H04W 48/16; H04W 48/02; H04W 48/10
See application file for complete search history.

(56) References Cited

U.S. PATENT DOCUMENTS

2006/0229102 A1* 10/2006 Kitazoe ............... H04W 72/042
455/560
2014/0295836 A1* 10/2014 Frenger ............... H04W 74/006
455/434

(Continued)

FOREIGN PATENT DOCUMENTS

| WO | 2013077783 A1 | 5/2013 |
| WO | 2016053155 A1 | 4/2016 |

OTHER PUBLICATIONS

Frenger, P. et al., "A Clean Slate Radio Network Designed for Maximum Energy Performance", IEEE 25th International Symposium on Personal, Indoor and Mobile Radio Communications, Sep. 2, 2014, pp. 1300-1304.

(Continued)

*Primary Examiner* — Magdi Elhag
(74) *Attorney, Agent, or Firm* — Coats & Bennett, PLLC

(57) ABSTRACT

A network node (600), a wireless device (602) and methods therein, for enabling access to a radio network. System signatures are associated with corresponding system information configurations that can be used for accessing the radio network in a first area. The system signatures are reused in a second area as associated with system information configurations which are different than in the first area. The network node (600) indicates (6:3) that at least one system information configuration stored in the wireless device (602) is invalid and should not be used. The wireless device (602) then makes (6:4) the at least one invalid system information configuration unusable in the wireless device, e.g. by deleting it from the wireless device (602). Thereby, (Continued)

the risk of using an incorrect system information configuration based on a reused system signature can be reduced or eliminated.

54 Claims, 4 Drawing Sheets

(51) Int. Cl.
  *H04W 52/02* (2009.01)
  *H04W 8/02* (2009.01)
(52) U.S. Cl.
  CPC ... *H04W 52/0219* (2013.01); *H04W 52/0222* (2013.01); *H04W 52/0229* (2013.01); *Y02D 70/1262* (2018.01); *Y02D 70/21* (2018.01)

(56) References Cited

U.S. PATENT DOCUMENTS

2015/0341855 A1* 11/2015 Bergman .............. H04W 48/18
  370/329
2016/0037425 A1* 2/2016 Van Lieshout ....... H04W 36/08
  370/332
2016/0262088 A1* 9/2016 Frenger ................. H04W 48/12
2016/0380810 A1* 12/2016 Morris ................ H04L 41/0889
  370/254

OTHER PUBLICATIONS

Frenger, P., "From Always Available to Always Optimized", 5Green Summer School, Aug. 27, 2014, pp. 1-28.

3rd Generation Partnership Project, "Technical Specification Group Radio Access Network; Evolved Universal Terrestrial Radio Access (E-UTRA); Radio Resource Control (RRC); Protocol specification (Release 12)", 3GPP TS 36.331 V12.7.0, Sep. 2015, pp. 1-453.

3rd Generation Partnership Project, "5G—Key Component of the Networked Society", 3GPP RAN Workshop on 5G, Sep. 17-18, 2015, pp. 1-55, Phoenix, US, RWS-150009.

* cited by examiner

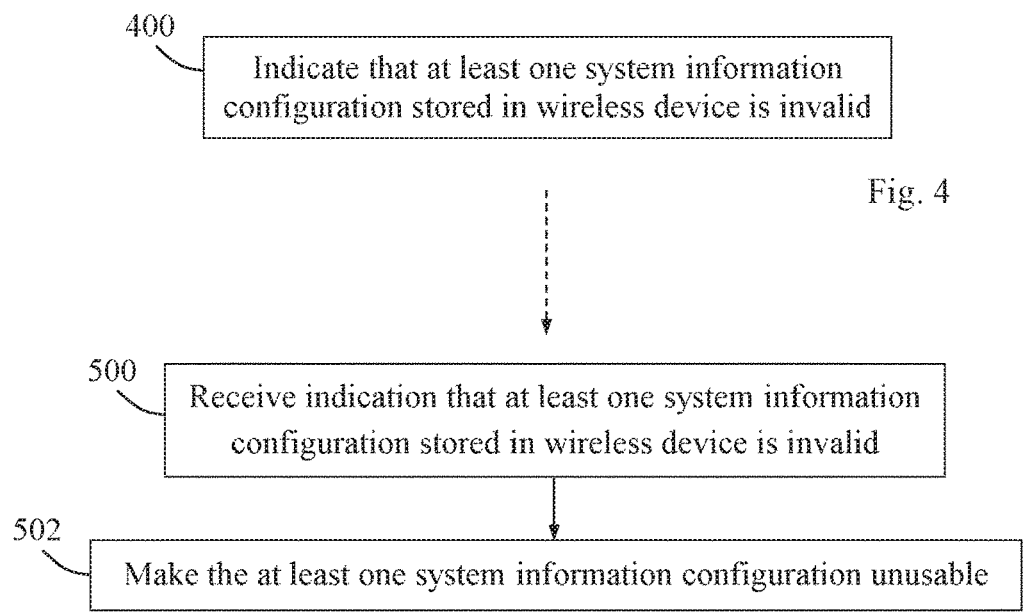
Fig. 4
Fig. 5
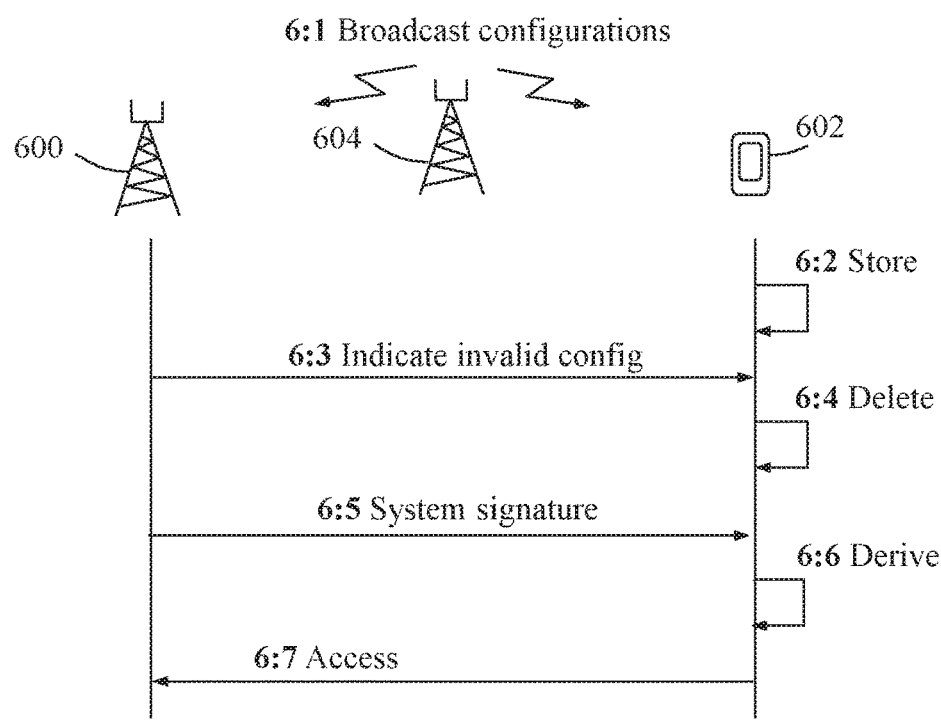
Fig. 6

METHODS, NETWORK NODE AND WIRELESS DEVICE FOR HANDLING SYSTEM INFORMATION

TECHNICAL FIELD

The present disclosure relates generally to a network node, a wireless device and methods therein, for enabling access to a radio network by the wireless device, based on configurations of system information associated with system signatures.

BACKGROUND

For some years, different types of radio networks for wireless communication have been developed to provide radio access for various wireless devices. The radio networks are constantly improved to provide better coverage and capacity to meet demands from subscribers using increasingly advanced services and devices such as smartphones and tablets, which may require considerable amounts of bandwidth and resources for data transport in the networks. A limiting factor for capacity in a radio network is the amount of available radio resources, e.g. in terms of time, frequency bandwidth and transmit power. The capacity of a radio network can be improved by utilizing any available radio resources as efficiently as possible, e.g. by reducing or minimizing the amount of signaling between the devices and the network in order to use the radio resources for communication of payload data and any mandatory messages.

In this disclosure, the term "wireless device" is used to represent any communication entity capable of radio communication with a radio network by sending and receiving radio signals, such as e.g. mobile telephones, tablets, laptop computers and so-called Machine-to-Machine, M2M, devices. Another equivalent common generic term in this field is "User Equipment, UE" which could also be used instead of wireless device throughout this description.

Further, the term "network node", is used herein to represent any node of a radio network that is operative to communicate radio signals with wireless devices. The network node in this disclosure could also be referred to as a base station, radio node, e-NodeB, eNB, NB, base transceiver station, access point, etc., depending on the type of network and terminology used. Furthermore, "network node" may also refer to an entity or equipment controlling the unit that is actually communicates radio signals with wireless devices. This may e.g. be a base band unit controlling a remote radio unit or a node controlling radio base stations, e.g. a radio network controller. It is further assumed that the radio network discussed herein provides radio coverage in different cells which are served by corresponding network nodes.

In order to improve capacity and performance in the radio network, various features can be employed that are intended to make the radio communication more efficient in terms of resource usage. Furthermore, it is desirable to reduce energy consumption in the network as well as the amount of interference generated by transmissions made by network nodes and wireless devices, which in turn could improve both capacity and performance. It is for example desirable to limit the broadcasting of system information from network nodes, sometimes generally referred to as the "broadcast layer".

In order to access a radio network, a wireless device has to acquire certain parameters which are generally broadcasted in the cells of the radio network in so-called system information, SI. Throughout this description, the term "cell" is used to represent any area in which a network node provides radio coverage for wireless devices. Hence, this description is not limited to cellular networks and it may be valid and useful for any type of radio network in which various network nodes provide radio coverage. The description may also be valid for radio networks in which network nodes use beamforming to cover respective areas with radio transmissions.

The network nodes thus broadcast a certain amount of information in each cell including synchronization signal(s) such as a Primary Synchronization Signal, PSS, and a Secondary Synchronization Signal, SSS, as in a 3GPP Long Term Evolution, LTE, system, which signals can be used by the wireless device to obtain frequency and time synchronization with respect to symbol and frame, respectively. These LTE signals also encode the Physical Cell Identity, PCI. After synchronization and PCI detection, the wireless device is capable of performing channel estimation using broadcasted cell specific reference signals C-RSs, and finally decode the broadcasted system information. The PSS/SSS and C-RSs are constantly transmitted by the LTE network and they can thus be used by wireless devices to synchronize and perform channel estimation.

In LTE networks, the broadcasted system information is structured by means of System Information Blocks, SIBs, which include a Master Information Block, MIB, a System Information Block Type 1, SIB1, and a System Information Block Type 2, SIB2. The MIB includes a limited number of the most frequently transmitted parameters which are essential for a wireless device's initial access to the network. The SIB1 contains parameters needed to determine if a cell is suitable for cell selection, as well as information about the time-domain scheduling of the other SIBs. The SIB2 includes certain common and shared channel information. Further SIB types have also been defined and the list of SIBs has been expanding over the years and it is expected to continue increasing. The system information is constantly broadcasted in the network with some periodicity, depending on the type of information. It can thus be readily understood that much energy and radio resources would be consumed when broadcasting all this information throughout the network.

It has been proposed that the same system information should be broadcasted at regular intervals in a synchronized manner over a relatively large area, so as to reduce and minimize the total broadcast duration and avoid interference. The goal is to transmit as little as possible apart from data transmissions to individual devices. If there are no ongoing data transmissions in a particular cell or area, the network nodes of that area can turn off their transmitter between the broadcasting occasions to save power and also to avoid interference in adjacent areas.

However, different network nodes may need to apply different system information configurations locally in different cells or areas, depending on the current conditions which may include: the network node's capacity, its carrier frequencies, size of the cell, expected frequency of access attempts, expected traffic volume, current ongoing data communications, the number of wireless devices present in the cell or area, the number of access messages currently being transmitted, and so forth. A network node may even apply different system information configurations in different cells served by the same network node.

If aggregated system information containing all possible system information configurations is broadcasted over a large area and stored in the wireless devices, a selected system signature pointing to a specific system information configuration can be transmitted locally in a cell, i.e. smaller area, to indicate that this configuration is valid in this cell or area, so that any wireless devices in the cell or small area can use the system signature as a "key" to extract the system information configuration from the stored system information which is valid in this particular area.

Any wireless devices present in this area are thereby able to derive a relevant system information configuration from its stored system information based on the system signature, which may be a signature index sequence, SSI, or a PCI, which is thus transmitted locally in the area as a reference to the system information configuration to be used in this area.

FIG. 1 illustrates an example of a communication scenario in a hierarchical network structure comprising various network nodes including a network node 100 providing radio coverage over a relatively large area C1 and a plurality of further network nodes 102 providing radio coverage over much smaller areas C2 substantially within the area C1. The network node 100 broadcasts system information over the large area C1 which can be read by any wireless devices D present in the area C1. Alternatively, the system information may be broadcasted in a synchronized manner by several network nodes, not necessarily arranged hierarchically, which together cover a large area. Typically, system information needs to be broadcasted with enough reliability so that it can be received properly by any wireless device present within the large radio coverage area C1. Network nodes transmitting system information may aggregate and transmit system information and such aggregated system information may be provided in a so-called Access Information Table, AIT.

Each network node 102 transmits a system signature, e.g. SSI, locally in the respective area C2 to indicate different system information configurations in different areas C2. There are several possible ways of communicating the system information AIT and the system signatures SSI in a radio network, including all network nodes transmitting both the AIT and respective SSIs, or some network nodes transmitting the AIT and other network nodes transmitting the SSIs, or one macro node transmitting the AIT and smaller nodes under the macro node transmitting the SSIs, and so forth.

FIG. 2 illustrates that system information configurations are broadcasted in an AIT with a certain periodicity over time and the system signature is signaled in an SSI with another periodicity that may be shorter than the periodicity of the AIT. It is also possible to transmit the AIT and SSI together at the same time. The AIT may thus be broadcasted over a large area, e.g. by a network node such as the macro node 100 over area C1 in FIG. 1, and different SSIs may be transmitted in smaller areas within the large area, e.g. by the smaller network nodes 102 over areas C2.

Once a wireless device has received a system signature such as an SSI in a particular area, it will be able to derive an associated system information configuration from the AIT which it has previously received and stored. This system information configuration and its parameter settings can then be used by the wireless device for accessing the radio network in that particular area. The SSI, or generally the system signature, is effectively a "key" for deriving the correct and valid system information configuration from the broadcasted system information configurations, e.g. the AIT. When the wireless device moves to another area, it will receive another SSI and derive another system information configuration accordingly which is valid and should be used in the new area.

However, it is a problem that a network containing a large number of cells would need to employ a large number of unique system signatures to enable the use different system information configurations in the cells throughout the network. If the number of system signatures is large, their unique identities would require a great number of bits resulting in too high complexity in the wireless devices when trying to decode the transmitted system signatures. It is therefore necessary to limit the number of unique system signatures and hence reuse them in several cells across the network. It may also be that the same system signatures comprised of a limited number of bits are used by two different networks to reduce complexity, although the system signatures typically have different meanings, i.e. they are associated with different system information configurations, in the two networks.

Another problem is that in order to limit the number of bits that are transmitted over the air for energy efficiency purposes and reduced complexity, the system signatures SSIs must be kept short. If they have too many bits, e.g. in the size of MIB and SIB-1 and SIB-2 in LTE, the whole purpose of reducing energy consumption by transmitting the AIT and the SSIs as keys is spoilt. It is thus of great interest to keep the number of system signatures SSIs, and the number of bits therein, as low as possible by reusing them in multiple areas as described above.

As a result, one system signature that is used in one limited area as a reference to a certain system information configuration may be reused in another area as a reference to a different system information configuration. If so, there is a risk that a wireless device having saved a system information configuration when present in one area may use that system information configuration erroneously for accessing another area that reuses the same system signature for another system information configuration. The wireless device may even unwittingly try to access a new unpermitted network using a system information configuration acquired in a previous network.

In either case, such erroneous access attempts may be harmful to the network and other wireless devices by creating collisions and uncontrolled interference when using the wrong system information configuration. Some examples of such harmful behavior of the device include using the wrong radio resources for random access, using too high transmit power, using a non-allowed random access preamble, and so forth. The performance in the wireless device will naturally also suffer since it is not able to access the network wasting both time and battery power.

This situation is illustrated in FIG. 3 where a wireless device 300 first acquires system information configurations AIT-1 when present in one area 302 and further receives a system signature SSI 1 when transmitted from a serving network node 304. According to AIT-1, SSI 1 points to a certain system information configuration denoted "content X" which is stored by the wireless device 300 according to regular procedures. It should be noted that the same system signature may be transmitted over more than one area or cell as long as the same system information configuration is applicable in those areas. For example, the SSI does not even have a cell identity encoded.

The wireless device 300 then moves to another area 306 in which other system information configurations AIT-2 are valid. For example, each area 302, 306 may comprise one cell or a group of cells and the examples herein are not limited in this respect. The same system signature SSI 1 is reused in area 306 but points to another system information configuration denoted "content A" according to the system information AIT-2, where content A is different from content X, e.g. with respect to various radio parameters for radio access. When the wireless device 300 receives the same system signature SSI 1 transmitted from a serving network node 308 in area 306, the device 300 retrieves the previously stored content X, according to regular procedures, and uses the radio parameters according to content X for accessing the network node 308. Using content X instead of the correct content A will thus not be successful and may further be harmful in area 306, as explained above.

SUMMARY

It is an object of embodiments described herein to address at least some of the problems and issues outlined above. It is possible to achieve this object and others by using a network node, a wireless device and methods therein as defined in the attached independent claims.

According to one aspect, a method is performed by a network node of a radio network, for enabling a wireless device to access the radio network. It is assumed that in this radio network system signatures are associated with corresponding system information configurations that can be used for accessing the radio network in a first area, and that at least some of the system signatures are reused in a second area as associated with system information configurations which are different than in the first area. In this method the network node indicates that at least one system information configuration stored in the wireless device is invalid and should not be used.

Thereby, the wireless device will make sure that the invalid system information configuration is not applied when receiving its associated system signature after having moved into the second area where this system signature is associated with another system information configuration different than the invalid system information configuration which was valid in the first area.

According to another aspect, a network node of a radio network is arranged to enable a wireless device to access the radio network. In this radio network, system signatures are associated with corresponding system information configurations that can be used for accessing the radio network in a first area, and it is assumed that at least some of the system signatures are reused in a second area as associated with system information configurations which are different than in the first area. The network node comprises a processor and a memory, said memory comprising instructions executable by said processor whereby the network node is configured to:

indicate that at least one system information configuration stored in the wireless device is invalid and should not be used.

According to another aspect, a method is performed by a wireless device for enabling access to a radio network. It is assumed that system signatures are associated with corresponding system information configurations that can be used for accessing the radio network in a first area, and that at least some of the system signatures are reused in a second area as associated with system information configurations which are different than in the first area. In this method the wireless device receives, from a network node of the radio network, an indication that at least one system information configuration stored in the wireless device is invalid and should not be used. The wireless device then makes the at least one invalid system information configuration unusable in the wireless device.

According to another aspect, a wireless device is arranged to enable access to a radio network, wherein system signatures are associated with corresponding system information configurations that can be used for accessing the radio network in a first area, and wherein at least some of the system signatures are reused in a second area as associated with system information configurations which are different than in the first area. The wireless device comprises a processor and a memory, said memory comprising instructions executable by said processor whereby the wireless device is configured to:

receive, from a network node of the radio network, an indication that at least one system information configuration stored in the wireless device is invalid and should not be used, and make the at least one invalid system information configuration unusable in the wireless device.

The above network node, wireless device and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIG. 4 is a flow chart illustrating a procedure in a network node, according to further possible embodiments.

FIG. 5 is a flow chart illustrating a procedure in a wireless device, according to further possible embodiments.

FIG. 6 is a signaling diagram illustrating how the solution may be used, according to further possible embodiments.

DETAILED DESCRIPTION

Briefly described, a solution is provided that can be used to avoid or at least reduce the risk that a wireless device, having acquired system information configurations and associated system signatures in a first area, tries to access and communicate with a network node using an incorrect system information configuration and communication parameters therein, based on a system signature that is reused in a second area, which could otherwise be harmful in terms of collisions and interference as explained above. This can be achieved when the network node indicates to the wireless device that at least one system information configuration stored in the wireless device is invalid and should not be used. This solution thus allows that reuse of system signatures can be employed to limit the number of bits for encoding the system signatures, without any significant risk of harmful use of improper system information configuration.

As a result, the wireless device will make the at least one invalid system information configuration unusable, i.e. inoperative or deactivated, so as to prevent that the at least one system information configuration is applied when receiving its associated system signature after having moved into the second area where this system signature is associated with another system information configuration different than the one in the first area. In this context, the term "unusable" indicates that the wireless device makes sure that it does not use an invalid system information configuration for accessing the radio network whenever a system signature associated with the invalid system information configuration is received. For example, the wireless device may make the invalid system information configuration unusable either by deleting it from the stored system information configurations, e.g. an AIT, or mark it as invalid even though it remains stored in the wireless device. Throughout this disclosure, "mark as invalid" may be substituted by the equivalent term "invalidate".

Figure 1:
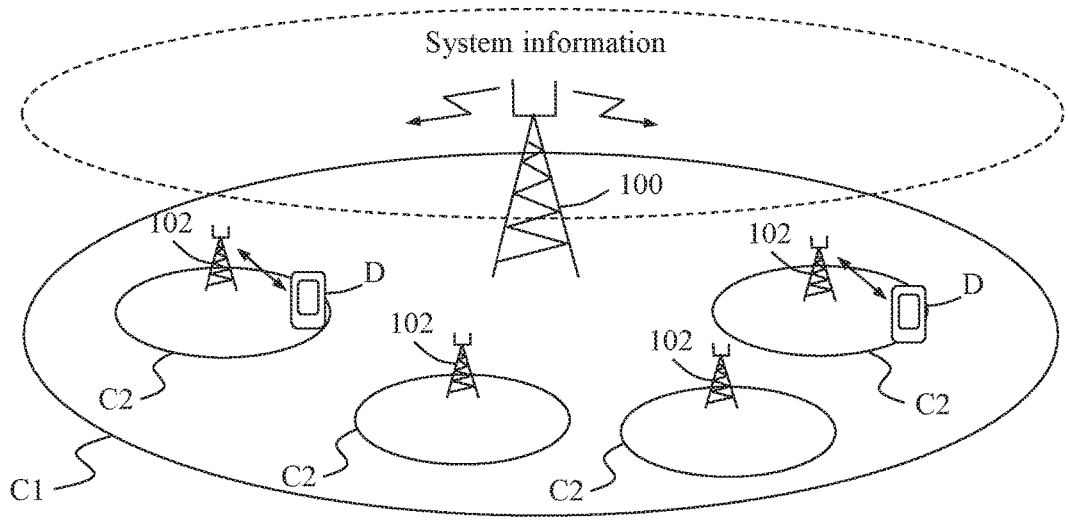
FIG. 1 is a communication scenario illustrating an example of how system information can be broadcasted in a radio network, according to the prior art.
Figure 2:
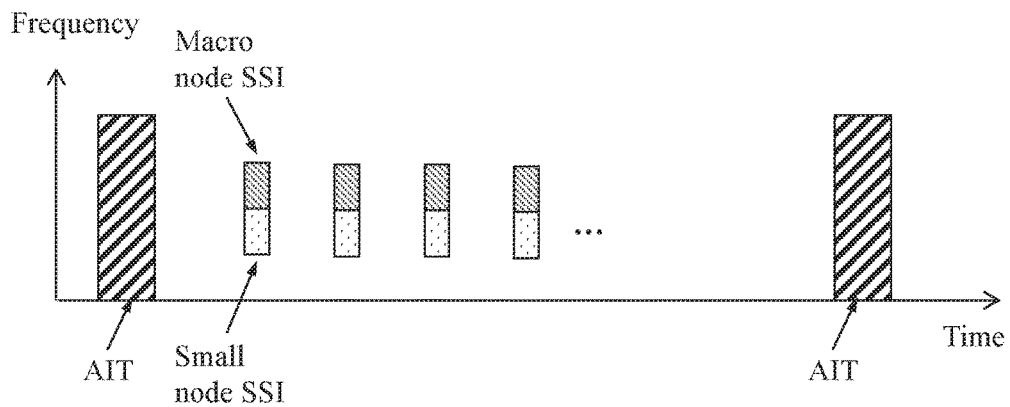
FIG. 2 is a schematic diagram illustrating how system information configurations and system signatures may be transmitted over time in a radio network, according to the prior art.
Figure 3:
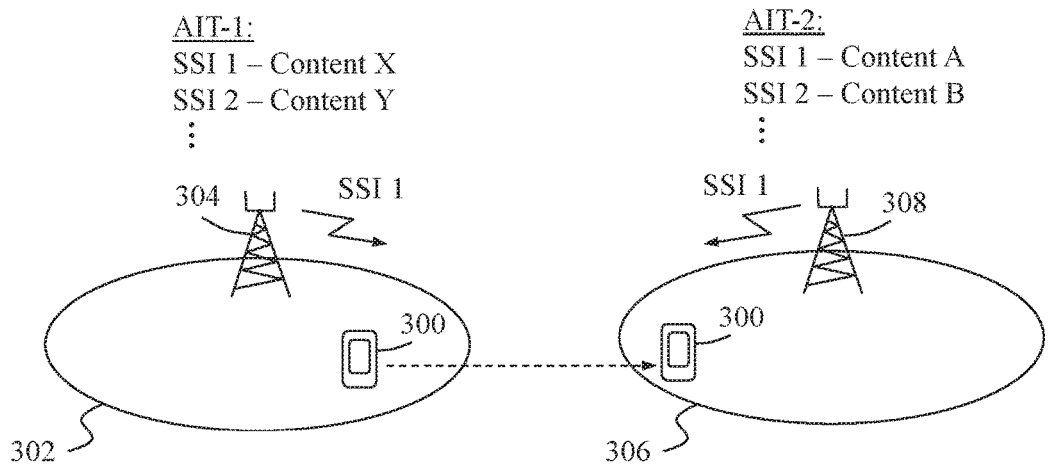
FIG. 3 is a communication scenario illustrating an example of how confusion of system information configurations may occur, according to the prior art.

It is an advantage of this solution that the wireless device can store System Information configurations, e.g. in an AIT, associated with SSIs, PCIs or other system signatures, such that the wireless device can access the network by selecting and using one specific System Information configuration from its stored System Information configurations based on a received system signature. At the same time it is possible to reuse system signatures across the radio network, which limits the maximum number of needed SSIs, which avoids high complexity and power consumption as explained above, without risking that an invalid system information configuration is used for accessing the radio network such in the scenario of FIG. 3. In the following description, the term SSI is used to represent any system signature that is associated with a System Information configuration. This system signature could in case of LTE be the PCI, encoded by the synchronization signals PSS/SSS.

An example of how the solution may be employed in terms of actions in a procedure performed by a network node of a radio network, for enabling a wireless device to access the radio network, will now be described with reference to the flow chart in FIG. 4. This procedure can thus be used to accomplish the functionality described above, and some possible but non-limiting embodiments will also be described. It is assumed that system signatures are associated with corresponding system information configurations that can be used for accessing the radio network in a first area, and that at least some of the system signatures are reused in a second area as associated with system information configurations which are different than in the first area. In other words, each reused system signature is associated with one system information configuration in the first area and with another different system information configuration in the second area, as explained above.

An action 400 illustrates that the network node indicates that at least one system information configuration stored in the wireless device is invalid and should not be used. There are several possible ways of how the network node can perform this indication and some examples will be outlined below.

In one possible embodiment, the network node may perform said indicating by transmitting at least one new system information configuration to be stored in the wireless device. In further possible embodiments, the network node may perform said indicating by transmitting to the wireless device an instruction to delete or mark as invalid the at least one invalid system information configuration.

In another possible embodiment, the above-mentioned instruction may indicate a range or set of system signatures associated with a corresponding range or set of invalid system information configurations. In further possible embodiments, the instruction may indicate a start system signature and a stop system signature in the range or set of system signatures, so that the wireless device will be informed that all system signatures and associated system information configurations between the start system signature and the stop system signature are invalid. The instruction may alternatively indicate a "limit system signature" to imply that all system signatures and associated system information configurations above or below the limit system signature are invalid.

In another possible embodiment, the network node may transmit to the wireless device new system information configurations to be stored in the wireless device instead of the invalid system information configurations.

In another possible embodiment, the network node may transmit to the wireless device delta information comprising a difference between the new system information configurations and the invalid system information configurations.

In another possible embodiment, the network node may transmit said instruction to the wireless device in a dedicated message during an active mode mobility procedure.

In another possible embodiment, the instruction may instruct the wireless device to delete or mark as invalid all system information configurations and associated system signatures that have been stored in the wireless device, and to acquire and store new system information configurations and associated system signatures. The wireless device may for example acquire such new system information configurations and associated system signatures when broadcasted in the second area, or the wireless device may be configured with the new system information configurations and associated system signatures in advance, e.g. hard coded in the device, or during a network attach procedure.

In another possible embodiment, the instruction may comprise a sequence number, a checksum or a hash which could be recognized by the wireless device as an identification of said instruction.

In another possible embodiment, the network node may perform said indicating by providing the system information configurations with the at least one invalid system information configuration indicated. In another possible embodiment, the network node may perform said providing by indicating a range or set of system signatures associated with a corresponding range or set of invalid system information configurations.

In another possible embodiment, the network node may perform said indicating by configuring the wireless device to delete or mark as invalid the at least one invalid system information configuration and associated system signature after a preset time period or after a preset number of communication events involving the wireless device.

In another possible embodiment, an intermediate area may be configured between the first and second areas, such that the wireless device shall keep its stored system information configurations and associated system signatures when moving to the intermediate area. Some examples of how AITs and SSIs may be organized in practice for two areas 1 and 2 when embodiments herein are used, will be described later below with reference to FIGS. 7A-D.

The solution thus provides a mechanism for the network to inform the wireless device when a certain System Information configuration, e.g. as provided in an AIT, associated with a specific system signature such as SSI or PCI, is no longer valid, so that the wireless device can delete the indicated configuration from its AIT, or mark it as invalid in the AIT. At the same time, or later, the wireless device may acquire a new System Information configuration associated with the same SSI value which is valid, e.g. when the wireless device is present in the second area. The acquired new System Information configuration would typically be different from the one that was deleted or marked as invalid, but if some time has elapsed since the deletion, the new System Information may be the same as the deleted one, e.g. because the wireless device may have moved to a location where it is valid, e.g. in the first area where the deleted System Information configuration was originally retrieved.

An example of how the solution may be employed in terms of actions in a procedure performed by a wireless device for enabling access to a radio network, will now be described with reference to the flow chart in FIG. 5. This procedure can thus be used to accomplish the functionality described above, and some possible but non-limiting embodiments will also be described below. The wireless device in this procedure corresponds to the wireless device referred to in the procedure of FIG. 4. As in the procedure of FIG. 4, it is assumed that system signatures are associated with corresponding broadcasted configurations of system information configurations that can be used for accessing the radio network in a first area, and that at least some of the system signatures are reused in a second area as associated with configurations of the system information configurations which are different than in the first area.

A first action 500 illustrates that the wireless device receives, from a network node of the radio network, an indication that at least one system information configuration stored in the wireless device is invalid and should not be used. In another action 502, the wireless device makes the at least one invalid system information configuration unusable in the wireless device, e.g. by deleting it or marking it as invalid, as described above.

Various embodiments are possible to employ in the above procedure in the wireless device, which will be briefly outlined below. It can be noted that several of these embodiments correspond to respective embodiments described above for the procedure of FIG. 4.

In one possible embodiment, the received indication may comprise at least one new system information configuration to be stored in the wireless device. For example, the wireless device could be configured to operate so that when it receives a new System Information configuration, either dedicated or broadcasted, which is associated with a system signature SSI-b, the wireless device will at the same time delete an old configuration e.g. associated with another system signature SSI-a. This way, the wireless device will never store more System Information configurations than a certain maximum number of configurations, which could be hardcoded or configurable by the network. Thereby, it is possible to avoid the above-described problems with the reuse of SSIs since by the time the wireless device has moved from one SSI use area to another area reusing the same SSI, the wireless device should have received so many other System Information configurations so that it is likely to have deleted the old configuration associated with the SSI that is reused. The wireless device may select which old configuration it should delete or mark as invalid when it receives a new one, e.g. by using a "first-in-first-out" rule, or the oldest configuration which has not been used in the longest period of time may be deleted.

In another possible embodiment, said indication may comprise an instruction to delete or mark as invalid the at least one invalid system information configuration.

In another possible embodiment, said instruction may indicate a range or set of system signatures associated with a corresponding range or set of invalid system information configurations. In another possible embodiment, the wireless device may receive from the network node new system information configurations to be stored in the wireless device instead of the invalid system information configurations. In another possible embodiment, said indication may comprise delta information comprising a difference between the new system information configurations and the invalid system information configurations.

In another possible embodiment, the wireless device may receive the instruction from the network node in a dedicated message during an active mode mobility procedure.

In another possible embodiment, said instruction may instruct the wireless device to delete or mark as invalid all system information configurations and associated system signatures stored in the wireless device, and to acquire and store new system information configurations and associated system signatures.

In another possible embodiment, said indication may comprise the system information configurations transmitted with the at least one invalid system information configuration indicated.

In another possible embodiment, said indication may indicate a range or set of system signatures associated with a corresponding range or set of invalid system information configurations.

In another possible embodiment, said indication may indicate that the wireless device shall delete or mark as invalid the at least one invalid system information configuration and associated system signature after a preset time period or after a preset number of communication events involving the wireless device. For example, a communication event in this context could be a handover, cell reselection, traffic activity or detecting a new SSI, etc. Alternatively, the wireless device should clear the whole AIT after a period of time or after the preset number of communication events have occurred.

In another possible embodiment, the wireless device may keep its stored system information configurations and associated system signatures when moving in an intermediate area configured between the first and second areas. Some examples of this will be described later below with reference to FIGS. 7A-D.

A simplified but illustrative example of how the solution may be put to practice, will now be described with reference to FIG. 6 where a network node 600 of a radio network is serving a wireless device 602. A first action 6:1 illustrates that a network node 604 broadcasts a set of system information configurations which are valid and can be used for accessing the radio network in a first area. It should be noted that the broadcasting network node 604 may be the same one as network node 600 or it may be a different network node. A next action 6:2 illustrates that the wireless device 602 stores the broadcasted system information configurations.

In a further action 6:3, the network node 600 indicates that a system information configuration stored in the wireless device 602 is invalid and should not be used, which thus corresponds to actions 400 and 500. Various examples of how this indication may be done have been described above. The wireless device 602 then accordingly makes the invalid system information configuration unusable, in this example by deleting it, in a following action 6:4, which thus corresponds to action 502. Various examples of how a wireless device may make an invalid system information configuration unusable when receiving such an indication have been described above.

Later on, the network node 600 transmits a system signature in an action 6:5 which is received by the wireless device 602. Thereby, the wireless device 602 is able to derive a system information configuration that is associated with the received system signature from its stored system information configurations, in an action 6:6. A final action 6:7 illustrates that the wireless device 602 accesses the network node 600 using the system information configuration derived in action 6:6.

A non-limiting example of how a network node and a wireless device may be structured to bring about the above-described solution and embodiments thereof, will now be described with reference to the block diagram in FIG. 8. In this figure, the network node 800 and the wireless device 802 may be configured to operate according to any of the examples and embodiments of employing the solution as described above, where appropriate, and as follows. Each of the network node 800 and the wireless device 802 is shown to comprise a processor "P", a memory "M" and a communication circuit "C" with suitable equipment for transmitting and receiving radio signals in the manner described herein.

The communication circuit C in each of the network node 800 and the wireless device 802 thus comprises equipment configured for communication over a radio interface using a suitable protocol for radio communication depending on the implementation and type of network. The solution is however not limited to any specific types of network, messages and protocols. An example of such a communication was described above with reference to FIG. 6.

The actions of FIGS. 4 and 5 may be performed by means of functional modules in the respective processors P in the network node 800 and the wireless device 802. For example, the network node 800 comprises means configured or arranged to perform action 400 of the flow chart in FIG. 4 in the manner described above. Further, the wireless device 802 comprises means configured or arranged to perform the actions 500-502 of the flow chart in FIG. 4 in the manner described above.

The network node 800 is arranged to enable a wireless device, such as device 802, to access the radio network. It is assumed that system signatures are associated with corresponding system information configurations that can be used for accessing the radio network in a first area, and that at least some of the system signatures are reused in a second area as associated with system information configurations which are different than in the first area. The network node 800 thus comprises the processor P and the memory M, said memory comprising instructions executable by said processor, whereby the network node 800 is operative as follows.

The network node 800 is configured to indicate that at least one system information configuration stored in the wireless device is invalid and should not be used. This operation may be performed by an indicating module 800A in the network node 800, e.g. in the manner described for action 400 above. The network node 800 may further be configured to accomplish any of the embodiments described above for FIG. 4.

The wireless device 802 is arranged to enable access to a radio network, wherein system signatures are associated with corresponding system information configurations that can be used for accessing the radio network in a first area, and wherein at least some of the system signatures are reused in a second area as associated with system information configurations which are different than in the first area. The wireless device 802 comprises a processor P and a memory M, said memory comprising instructions executable by said processor whereby the wireless device 802 is operative as follows.

The wireless device 802 is configured to receive, from a network node of the radio network such as the network node 800, an indication that at least one system information configuration stored in the wireless device is invalid and should not be used. This operation may be performed by a receiving module 802A in the wireless device 802, e.g. in the manner described for action 500 above.

The wireless device 802 is also configured to make the at least one invalid system information configuration unusable in the wireless device. This operation may be performed by a making module 802B in the wireless device 802, e.g. in the manner described for action 502 above. The wireless device 802 may further be configured to accomplish any of the embodiments described above for FIG. 5.

Figure 8:
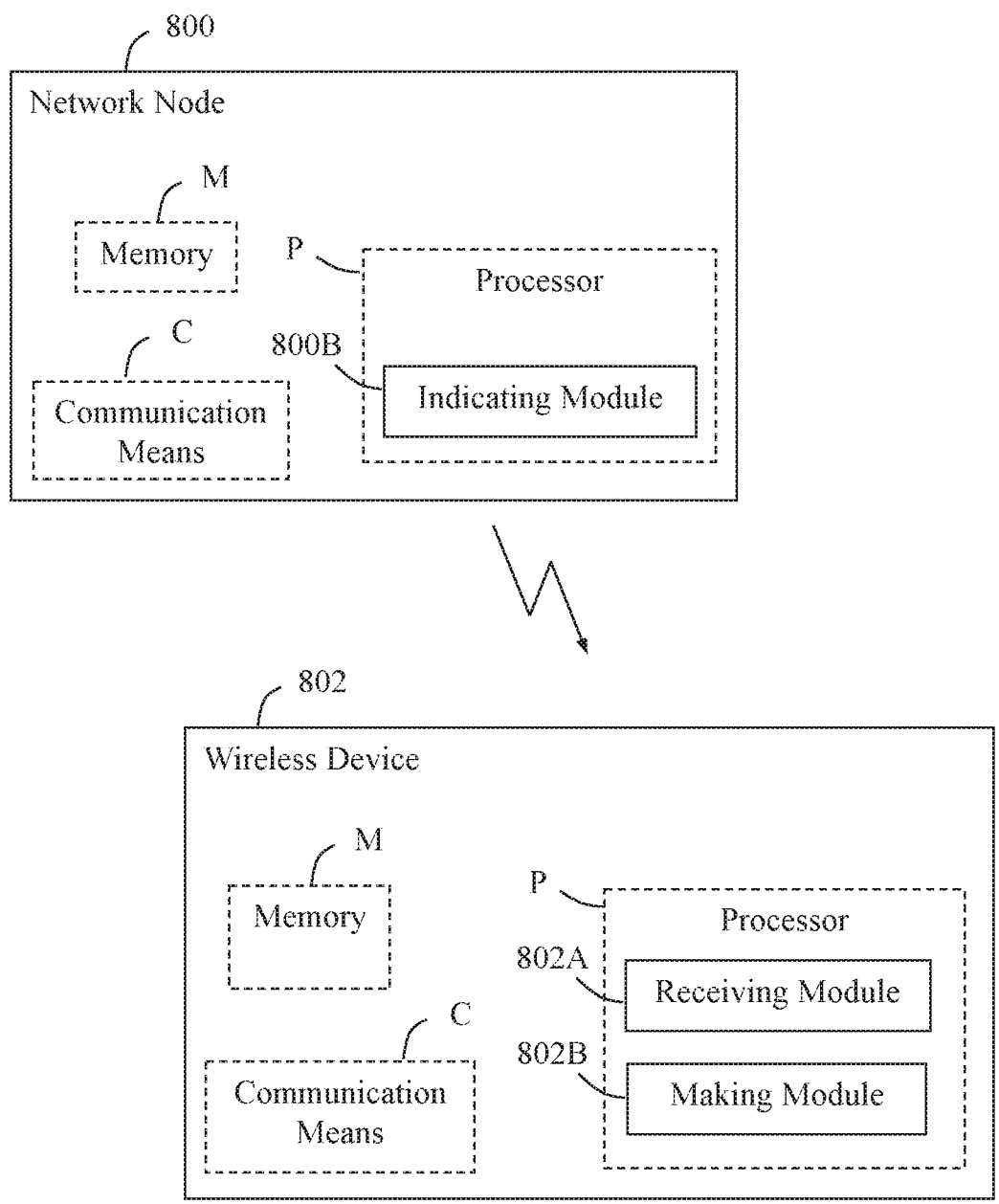
FIG. 8 is a block diagram illustrating a network node and a wireless device in more detail, according to further possible embodiments.

It should be noted that FIG. 8 illustrates various functional modules in the network node 800 and the wireless device 802, respectively, and the skilled person is able to implement these functional modules in practice using suitable software and hardware. Thus, the solution is generally not limited to the shown structures of the network node 800 and the wireless device 802, and the functional modules 800A and 802A-B therein may be configured to operate according to any of the features and embodiments described in this disclosure, where appropriate.

The functional modules 800A and 802A-B described above may be implemented in the network node 800 and the wireless device 802, respectively, by means of program modules of a respective computer program comprising code means which, when run by the processor P causes the network node 800 and the wireless device 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 800 and the wireless device 802 in the form of a memory having a computer readable medium and being connected to the processor P. The computer program product or memory M in each of the network node 800 and the wireless device 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 800 and the wireless device 802.

The solution described herein may be implemented in each of the network node 800 and the wireless device 802 by a computer program comprising instructions which, when executed on at least one processor, cause the at least one processor to carry out the actions according to any of the above embodiments, where appropriate. The solution may also be implemented at each of the network node 800 and the wireless device 802 in a carrier containing the above computer program, wherein the carrier is one of an electronic signal, optical signal, radio signal, or computer readable storage medium.

Some further possible examples and details of how the AITs and SSIs may be organized in practice for two areas 1 and 2 when embodiments herein are used, will now be described with reference to FIGS. 7A-D.

Example 1

Figure 7A:
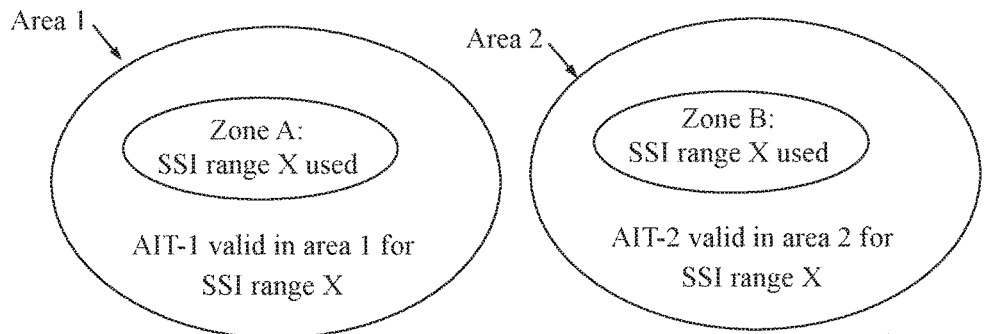
FIGS. 7A-7D illustrate some examples of how system information configurations AIT and system signatures SSI may be organized in practice for different areas and zones, according to further possible embodiments.

In the example illustrated in FIG. 7A, the radio network is divided into two areas 1 and 2, where one area 1 provides the wireless device, not shown, with one set of System Information configurations AIT-1 associated with one set of SSIs 1-X, denoted Range X, and the other area 2 provides the wireless device with another set of System Information configurations AIT-2 associated with the same set of SSIs 1-X, i.e. Range X. Each actual usage area of the set of SSIs 1-X, Range X, should preferably not border the other area providing the different configuration, i.e. the areas providing the SSIs of Range X, denoted Zone A and Zone B, respectively, are smaller sub-areas within the previous areas 1 and 2.

Example 2

Figure 7B:
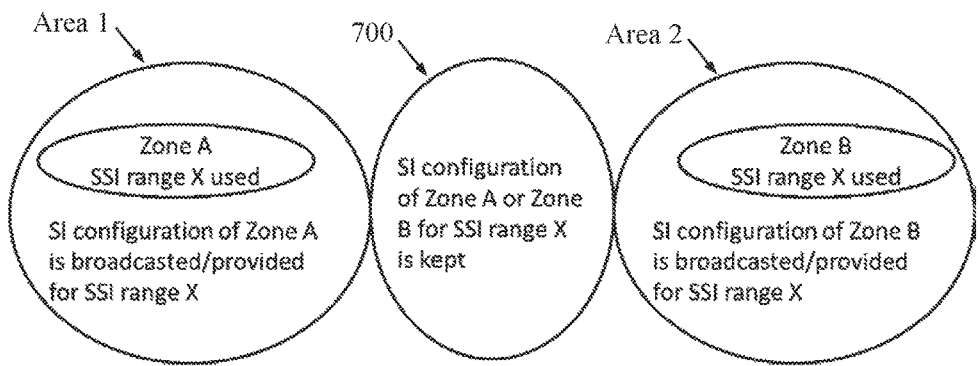

In the example illustrated in FIG. 7B, the radio network is again divided into two areas, where area 1 provides the wireless device, not shown, with one set of System Information configurations for one set of SSIs, Range X, and the other area 2 provide the wireless device with another configuration for the same set of SSIs, Range X, which is similar to Example 1. If areas 1 and 2 are very close to one another, e.g. with their respective borders virtually coinciding, any wireless device located in the border area between these two areas 1 and 2 may potentially need to re-acquire the System Information configurations many times when moving between the areas, hence in a "ping-pong" manner. An enhancement of the Example 1 above is to create an additional area 700 in between the two areas 1 and 2 where the System Information is not changed, as shown in FIG. 7B. An advantage with this area 700 is that the System Information configurations are changed only when the wireless device moves from the middle area 700 to one area 1 or 2, but if the wireless device moves back into the middle area 700, the System Information configurations can be kept unchanged in the wireless device, i.e. they do not need to be re-acquired, thus avoiding or at least reducing the above ping-pong behavior.

Example 3

Figure 7C:
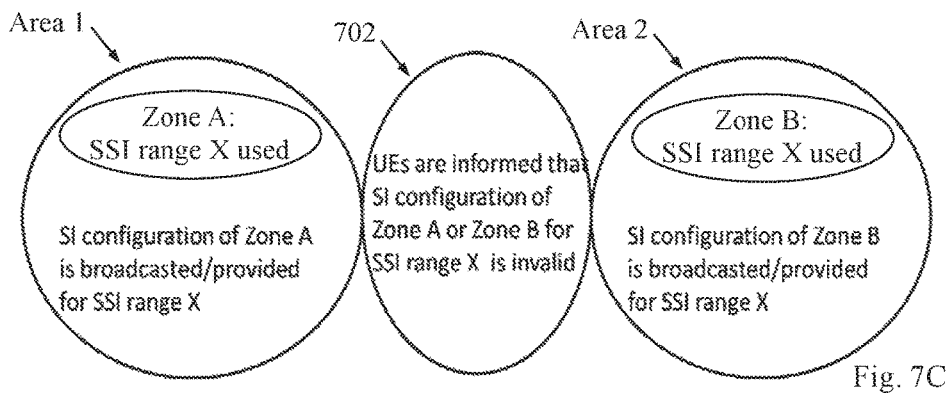

Examples 1 and 2 require that the actual use of the set of SSIs, Range X, in Zones A and B is not done at a border region of the areas that provide the SSI configuration. In the example illustrated in FIG. 7C, the sub-area 700 of Example 2 is omitted but instead use and provide the SSI configuration in the same area. In this case the radio network needs to have another area 702 in-between the two Zones A and B, as illustrated in FIG. 7C, where SSIs are reused. In this in-between area 702 the wireless device, not shown, should be informed that the set of SSIs, range X, is invalid.

Example 4

Figure 7D:
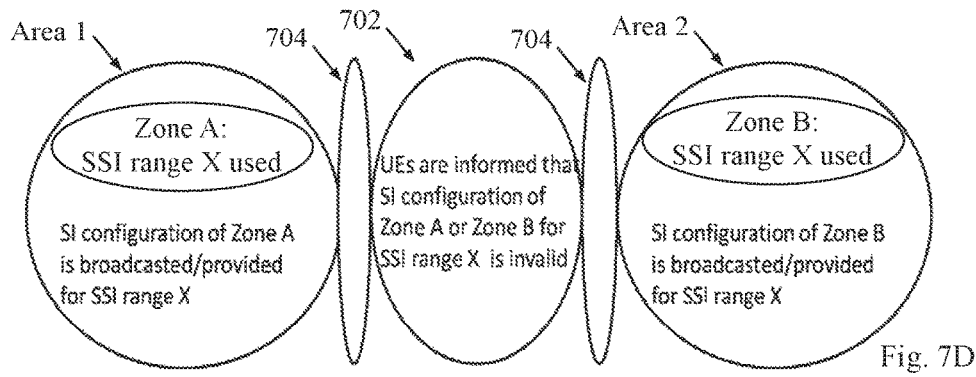

In the example illustrated in FIG. 7D, the arrangement in Example 3 has been further improved by adding in-between areas 704 where the system information should be kept in the wireless device, similar to Example 2. This avoids the situation of deletion-reacquisition of the system information in a ping-pong manner if the wireless device, not shown, moves back and forth between Zone A or B and the in-between area 702 as in Example 3.

While the solution has been described with reference to specific exemplifying embodiments, the description is generally only intended to illustrate the inventive concept and should not be taken as limiting the scope of the solution. For example, the terms "network node", "wireless device", "system information configuration" and "system signatures" have been used throughout this disclosure, although any other corresponding entities, functions, and/or parameters could also be used having the features and characteristics described here. The solution is defined by the appended claims.

The invention claimed is:

1. A method, performed by a network node of a radio network, for enabling a wireless device to access the radio network, wherein system signatures are associated with corresponding system information configurations that can be used for accessing the radio network in a first area, and wherein at least some of the system signatures are reused in a second area as associated with system information configurations which are different than in the first area, the method comprising:
   indicating that at least one conflicting system information configuration stored in the wireless device is invalid and should not be used.

2. The method of claim 1, wherein the indicating is performed by transmitting at least one new system information configuration to be stored in the wireless device.

3. The method of claim 1, wherein the indicating is performed by transmitting, to the wireless device, an instruction to delete or mark as invalid the at least one invalid system information configuration.

4. The method of claim 3, wherein the instruction indicates a range or set of system signatures associated with a corresponding range or set of invalid system information configurations.

5. The method of claim 4, wherein the instruction indicates a start system signature and a stop system signature in the range or set of system signatures, or indicates a limit system signature to imply that all system signatures and associated system information configurations above or below the limit system signature are invalid.

6. The method of claim 4, wherein the network node transmits to the wireless device new system information configurations to be stored in the wireless device instead of the invalid system information configurations.

7. The method of claim 6, wherein the network node transmits, to the wireless device, delta information comprising a difference between the new system information configurations and the invalid system information configurations.

8. The method of claim 3, wherein the instruction is transmitted to the wireless device in a dedicated message during an active mode mobility procedure.

9. The method of claim 3, wherein the instruction instructs the wireless device to delete or mark as invalid all system information configurations and associated system signatures stored in the wireless device, and to acquire and store new system information configurations and associated system signatures.

10. The method of claim 9, wherein the instruction comprises a sequence number, a checksum, or a hash.

11. The method of claim 1, wherein the indicating is performed by providing the system information configurations with the at least one invalid system information configuration indicated.

12. The method of claim 11, wherein the providing indicates a range or set of system signatures associated with a corresponding range or set of invalid system information configurations.

13. The method of claim 1, wherein the indicating includes configuring the wireless device to delete or mark as invalid the at least one invalid system information configuration and associated system signature after a preset time period or after a preset number of communication events involving the wireless device.

14. The method of claim 1, wherein an intermediate area is configured between the first and second areas, such that the wireless device shall keep its stored system information configurations and associated system signatures when moving to the intermediate area.

15. A network node of a radio network, the network node being configured to enable a wireless device to access the radio network, wherein system signatures are associated with corresponding system information configurations that can be used for accessing the radio network in a first area, and wherein at least some of the system signatures are reused in a second area as associated with system information configurations which are different than in the first area, the network node comprising:
   processing circuitry;
   memory containing instructions executable by the processing circuitry whereby the network node is operative to:
      indicate that at least one conflicting system information configuration stored in the wireless device is invalid and should not be used.

16. The network node of claim 15, wherein the instructions are such that the network node is operative to perform the indicating by transmitting at least one new system information configuration to be stored in the wireless device.

17. The network node of claim 15, wherein the instructions are such that the network node is operative to perform the indicating by transmitting to the wireless device a System information (SI) instruction to delete or mark as invalid the at least one invalid system information configuration.

18. The network node of claim 17, wherein the SI instruction indicates a range or set of system signatures associated with a corresponding range or set of invalid system information configurations.

19. The network node of claim 18, wherein the SI instruction indicates a start system signature and a stop system signature in the range or set of system signatures, or indicates a limit system signature to imply that all system signatures and associated system information configurations above or below the limit system signature are invalid.

20. The network node of claim 18, wherein the instructions are such that the network node is operative to transmit to the wireless device new system information configurations to be stored in the wireless device instead of the invalid system information configurations.

21. The network node of claim 20, wherein the instructions are such that the network node is operative to transmit to the wireless device delta information comprising a difference between the new system information configurations and the invalid system information configurations.

22. The network node of claim 17, wherein the instructions are such that the network node is operative to transmit the SI instruction to the wireless device in a dedicated message during an active mode mobility procedure.

23. The network node of claim 17, wherein the SI instruction instructs the wireless device to delete or mark as invalid all system information configurations and associated system signatures stored in the wireless device, and to acquire and store new system information configurations and associated system signatures.

24. The network node of claim 23, wherein the SI instruction comprises a sequence number, a checksum or a hash.

25. The network node of claim 15, wherein the instructions are such that the network node is operative to perform the indicating by providing the system information configurations with the at least one invalid system information configuration indicated.

26. The network node of claim 25, wherein the providing indicates a range or set of system signatures associated with a corresponding range or set of invalid system information configurations.

27. The network node of claim 15, wherein the instructions are such that the network node is operative to perform the indicating by configuring the wireless device to delete or mark as invalid the at least one invalid system information configuration and associated system signature after a preset time period or after a preset number of communication events involving the wireless device.

28. The network node of claim 15, wherein an intermediate area is configured between the first and second areas, such that the wireless device shall keep its stored system information configurations and associated system signatures when moving to the intermediate area.

29. A method, performed by wireless device, for enabling access to a radio network, wherein system signatures are associated with corresponding system information configurations that can be used for accessing the radio network in a first area, and wherein at least some of the system signatures are reused in a second area as associated with system information configurations which are different than in the first area, the method comprising:
   receiving, from a network node of the radio network, an indication that at least one conflicting system information configuration stored in the wireless device is invalid and should not be used; and
   making the at least one invalid system information configuration unusable in the wireless device.

30. The method of claim 29, wherein the indication comprises at least one new system information configuration to be stored in the wireless device.

31. The method of claim 29, wherein the indication comprises an instruction to delete or mark as invalid the at least one invalid system information configuration.

32. The method of claim 31, wherein the instruction indicates a range or set of system signatures associated with a corresponding range or set of invalid system information configurations.

33. The method of claim 32, wherein the wireless device receives, from the network node, new system information configurations to be stored in the wireless device instead of the invalid system information configurations.

34. The method of claim 33, wherein the indication comprises delta information comprising a difference between the new system information configurations and the invalid system information configurations.

35. The method of claim 31, wherein the instruction is received from the network node in a dedicated message during an active mode mobility procedure.

36. The method of claim 31, wherein the instruction instructs the wireless device to delete or mark as invalid all system information configurations and associated system signatures stored in the wireless device, and to acquire and store new system information configurations and associated system signatures.

37. The method of claim 29, wherein the indication comprises the system information configurations transmitted with the at least one invalid system information configuration indicated.

38. The method of claim 36, wherein the indication indicates a range or set of system signatures associated with a corresponding range or set of invalid system information configurations.

39. The method of claim 29, wherein the indication indicates that the wireless device shall delete or mark as invalid the at least one invalid system information configuration and associated system signature after a preset time period or after a preset number of communication events involving the wireless device.

40. The method of claim 29, wherein the wireless device keeps its stored system information configurations and associated system signatures when moving in an intermediate area configured between the first and second areas.

41. A wireless device configured to enable access to a radio network, wherein system signatures are associated with corresponding system information configurations that can be used for accessing the radio network in a first area, and wherein at least some of the system signatures are reused in a second area as associated with system information configurations which are different than in the first area, the wireless device comprising:
processing circuitry;
memory containing instructions executable by the processing circuitry whereby the wireless device is operative to:
receive, from a network node of the radio network, an indication that at least one conflicting system information configuration stored in the wireless device is invalid and should not be used; and
make the at least one invalid system information configuration unusable in the wireless device.

42. The wireless device of claim 41, wherein the indication comprises at least one new system information configuration to be stored in the wireless device.

43. The wireless device of claim 41, wherein the indication comprises a System Information (SI) instruction to delete or mark as invalid the at least one invalid system information configuration.

44. The wireless device of claim 43, wherein the SI instruction indicates a range or set of system signatures associated with a corresponding range or set of invalid system information configurations.

45. The wireless device of claim 44, wherein the instructions are such that the wireless device is configured to receive, from the network node, new system information configurations to be stored in the wireless device instead of the invalid system information configurations.

46. The wireless device of claim 45, wherein the indication comprises delta information comprising a difference between the new system information configurations and the invalid system information configurations.

47. The wireless device of claim 43, wherein the instructions are such that the wireless device is configured to receive the SI instruction, from the network node, in a dedicated message during an active mode mobility procedure.

48. The wireless device of claim 43, wherein the SI instruction instructs the wireless device to delete or mark as invalid all system information configurations and associated system signatures stored in the wireless device, and to acquire and store new system information configurations and associated system signatures.

49. The wireless device of claim 41, wherein the indication comprises the system information configurations transmitted with the at least one invalid system information configuration indicated.

50. The wireless device of claim 49, wherein the indication indicates a range or set of system signatures associated with a corresponding range or set of invalid system information configurations.

51. The wireless device of claim 41, wherein the indication indicates that the wireless device shall delete or mark as invalid the at least one invalid system information configuration and associated system signature after a preset time period or after a preset number of communication events involving the wireless device.

52. The wireless device of claim 41, wherein the instructions are such that the wireless device is configured to keep its stored system information configurations and associated system signatures when moving in an intermediate area configured between the first and second areas.

53. A non-transitory computer readable recording medium storing a computer program product for enabling a wireless device to access a radio network, wherein system signatures are associated with corresponding system information configurations that can be used for accessing the radio network in a first area, and wherein at least some of the system signatures are reused in a second area as associated with system information configurations which are different than in the first area, the computer program product comprising software instructions which, when run on processing circuitry of a network node of the radio network, causes the network node to:
indicate that at least one conflicting system information configuration stored in the wireless device is invalid and should not be used.

54. A non-transitory computer readable recording medium storing a computer program product for enabling access to a radio network, wherein system signatures are associated with corresponding system information configurations that can be used for accessing the radio network in a first area, and wherein at least some of the system signatures are reused in a second area as associated with system information configurations which are different than in the first area, the computer program product comprising software instructions which, when run on processing circuitry of a wireless device, causes the wireless device to:
receive, from a network node of the radio network, an indication that at least one conflicting system information configuration stored in the wireless device is invalid and should not be used; and
make the at least one invalid system information configuration unusable in the wireless device.

* * * * *